(12) United States Patent
Bertini et al.

(10) Patent No.: US 6,350,947 B1
(45) Date of Patent: Feb. 26, 2002

(54) FLOW-THROUGH CABLE (75) Inventors: Glen J. Bertini, Tacoma; Kim Jenkins, Issaquah; Keith Lanan, Renton, all of WA (US)

(73) Assignee: Utilx Corporation, Kent, WA (US)

( * ) Notice: Subject to any disclaimer, the term of this patent is extended or adjusted under 35 U.S.C. 154(b) by 0 days.

(21) Appl. No.: 09/390,967

(22) Filed: Sep. 7, 1999

(51) Int. Cl.⁷ .............................................. F16M 11/12
(52) U.S. Cl. ...................................................... 174/47
(58) Field of Search ........................... 174/47; 385/100, 385/103, 107, 113

(56) References Cited

U.S. PATENT DOCUMENTS

| | | |
|---|---|---|
| 306,037 A | 9/1884 | Turner |
| 306,307 A * | 9/1884 | Turner .................... 174/102 R |
| 1,846,361 A | 2/1932 | Saylor |
| 2,035,088 A | 3/1936 | McNamee |
| 2,803,692 A | 8/1957 | Richards et al. |
| 3,427,393 A | 2/1969 | Masterson |
| 4,536,610 A | 8/1985 | Giussani |
| 4,607,133 A | 8/1986 | Alloin et al. |
| 4,888,886 A | 12/1989 | Eager, Jr. et al. |
| 6,195,487 B1 * | 2/2001 | Anderson et al. ........... 385/101 |

FOREIGN PATENT DOCUMENTS

EP          0 621 607 A1    10/1994

* cited by examiner

Primary Examiner—Peter S. Wong
Assistant Examiner—Gary L. Laxton
(74) Attorney, Agent, or Firm—Christensen O'Connor Johnson Kindness PLLC (57) ABSTRACT

A flow-through cable for transmitting information (20) is provided. The cable includes a jacket (22) having a length and an information conducting core (26) coaxially received within the jacket. A first insulation layer (24) surrounds the information conducting core and has a dielectric strength. The cable further includes a first conduit (28) disposed within the jacket. The first conduit is adapted to permit a compound to flow therethrough and is chemically permeable to permit at least a portion of the compound to diffuse through the first conduit.

26 Claims, 9 Drawing Sheets

FLOW-THROUGH CABLE

FIELD OF THE INVENTION

The present invention relates generally to cables for transmitting information and, more particularly, to a conduit for injection of a compound into the interior of electrical cables.

BACKGROUND OF THE INVENTION

Underground electrical cable technology was developed and implemented because of its aesthetic advantages and reliability. Currently, underground electrical cables generally include a number of copper or aluminum strands surrounded by a semiconducting or insulating strand shield, a layer of insulation, and an insulation shield.

Underground electrical cables were initially touted as having a useful life of 25–40 years. However, the useful life of such cables has rarely exceeded 20 years, and has occasionally been as short as 10–12 years. In particular, the insulation tends to degrade over time because water enters the cable and forms water trees. Water trees are formed in the insulation when medium to high voltage alternating current is applied to a polymeric dielectric (insulator) in the presence of water and ions. As water trees grow, they compromise the dielectric properties of the polymer until the insulation fails. Many large water trees initiate at the site of an imperfection or a contaminant, but contamination is not a necessary condition for water trees to propagate.

Water tree growth can be eliminated or retarded by removing or minimizing the water or ions, or by reducing the voltage stress. Voltage stress can be minimized by employing thicker insulation. Clean room manufacturing processes can be used to both eliminate ion sources and minimize defects or contaminants that function as tree growth sites. Another approach is to change the character of the dielectric insulator, either through adding water tree retardant chemicals to the insulator, or by using more expensive, but water tree resistant, plastics or rubbers. Still yet another approach to eliminate or retard water tree growth is to encapsulate the entire electrical cable within a conduit having a larger diameter than the electrical cable. All of these approaches have merit, but only address the performance of electrical cable yet to be installed.

For electrical cables already underground, the options are more limited. Currently, a dielectric enhancement fluid may be injected into the interstices between the strands of electrical cables. The dielectric enhancement fluid reacts with water in the underground cable and polymerizes to form a water tree retardant that is more advanced than those used in the manufacture of modem cables. Although the injection of a dielectric enhancement fluid into the interstices of an electrical cable is effective as a water tree retardant, it is not without its problems.

First, the interstices between the strands of the cable may be blocked for a variety of reasons, including the presence of a splice, strand blocking material, or because the strands are highly compacted. As a result, it is often difficult, if not impossible, to inject the dielectric enhancement fluid into the cable. Second, in certain cables having a relatively small diameter, such as underground residential distribution (URD) cables, there is not enough interstitial volume between the strands of the cable to hold sufficient amounts of the dielectric enhancement fluid for maximum dielectric performance. As a result, such cables require an extended soak period of 60 days or more to allow for additional dielectric enhancement fluid to diffuse from the cable strands into the insulation layer. Finally, encapsulating an entire cable within a conduit is expensive.

Thus, there exists a need for a flow-through cable for transmitting information in which a compound can be injected into and distributed throughout, the cable at a relatively low cost, a high degree of reliability, and without interrupting the flow of current through the cable.

SUMMARY OF THE INVENTION

In accordance with the present invention, a flow-through cable for transmitting information is provided. The cable includes an information conducting core. The cable also includes a first insulation layer surrounding the information conducting core and a first conduit disposed within either the information conducting core or the first insulation layer. The first conduit is adapted to permit a compound flow therethrough. The first conduit is chemically permeable to permit at least a portion of the compound to diffuse through the first conduit and into the first insulation layer.

In accordance with other aspects of this invention, the information conducting core is a plurality of power strands.

In accordance with additional aspects of this invention, the first conduit is centrally received within the plurality of power strands. In accordance with other aspects of this invention, the cable further includes a chemically permeable second conduit, wherein the first and second conduits are disposed within the plurality of power strands.

In accordance with still yet other aspects of this invention, the cable further includes a strand shield surrounding the plurality of power strands, and the first and second conduits are disposed within the strand shield.

A flow-through cable for transmitting information formed in accordance with the present invention has several advantages over electric cables used in the past. First, disposing a first chemically permeable conduit within the cable eliminates the expense of sheathing the power cable within a large conduit. Second, providing a dedicated conduit to distribute a restoration compound throughout the length of a cable ensures an unblocked path through which the restoration compound may flow-through the entire length of the cable. Further, because the chemically permeable conduit is adapted to receive a variety of compounds, such as a desiccant liquid, gas or a tracer fluid, a flow-through cable for transmitting information formed in accordance with the present invention is more robust than those currently available. In summary, a flow-through cable for transmitting information formed in accordance with the present invention is cheaper to maintain and operate, more reliable, and more robust than currently available electric cables.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
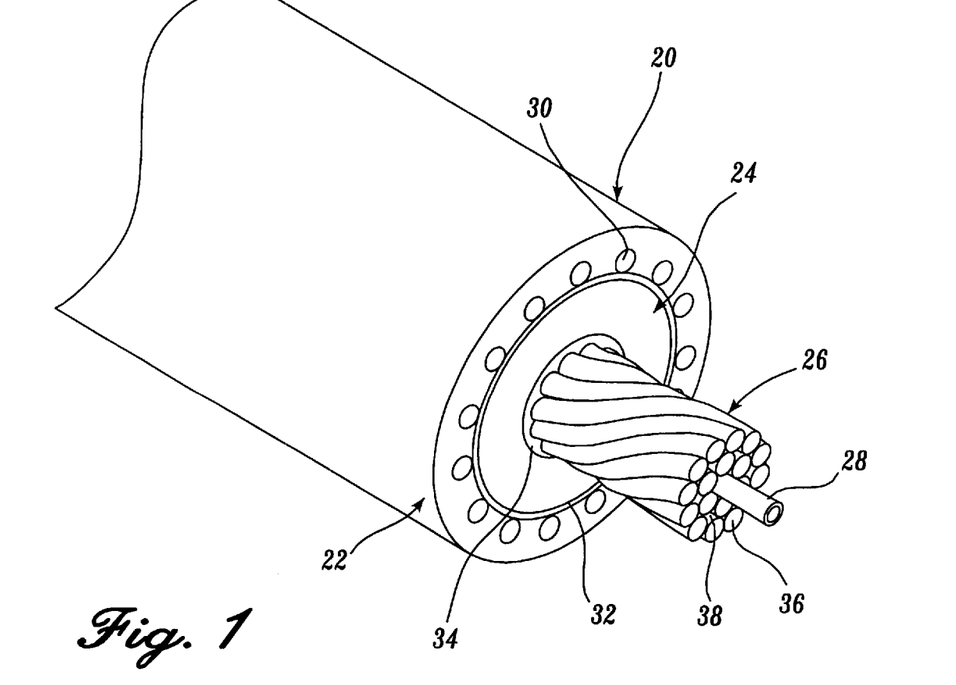
FIG. 1 is a perspective view of a flow-through cable for transmitting information formed in accordance with the present invention showing the major components of the electric cable.
Figure 2:
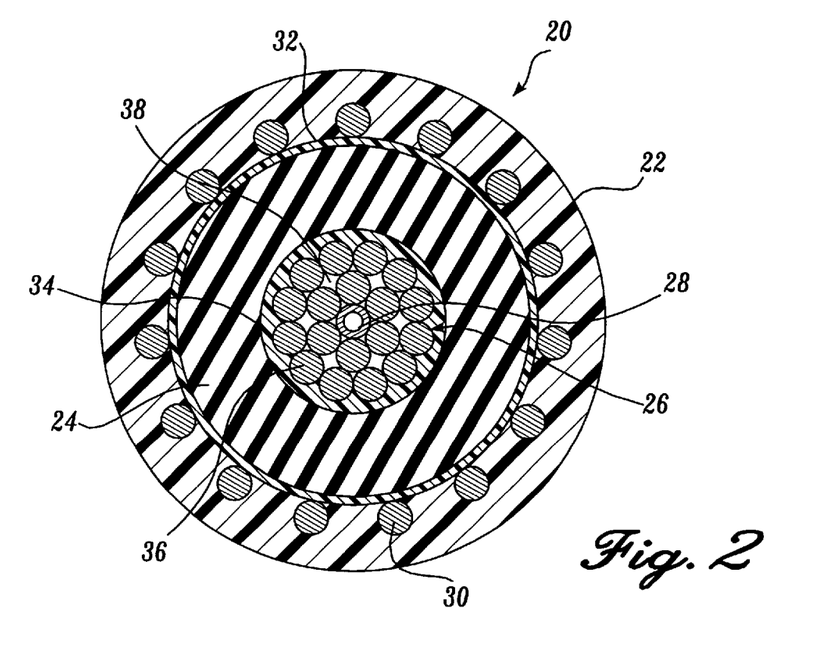
FIG. 2 is a cross-sectional end view of a flow-through cable for transmitting information formed in accordance with the present invention.

FIGS. 1 and 2 illustrate a preferred embodiment of a flow-through cable for transmitting information (hereinafter "cable 20") constructed in accordance with the present invention. The cable 20 includes a jacket 22, an insulation layer 24, a conductive core 26, and a tube 28. For ease of illustration and clarity, the cable 20 illustrated in FIGS. 1–8 is illustrated as a multiple conductive strand, 1/0-power cable, such as a medium voltage cable that carries between 5,000 and 35,000 volts. Further, the cable 20 illustrated in FIG. 9 is a fiber optic cable. However, it should be apparent that other types of cables, such as low voltage power cables, transmission voltage power cables, control cables, and communication cables including conductive pair, telephone, and digital communication, are also within the scope of the present invention. Thus, it should be apparent that within the meaning of the present invention, a cable for transmitting information includes not only electric cables, but also light transmitting cables.

The jacket 22 is suitably an elongate tubular member formed from a polyethylene material. As is well-known in the art, a plurality of longitudinally extending conductive neutral wires 30 are embedded within and extend the length of the jacket 22. In the preferred embodiment of FIGS. 1 and 2, a total of 15 conductive neutral wires 30 are disposed annularly around the insulation layer 24.

The insulation layer 24 is suitably formed from a high molecular weight polyethylene (HMWPE) polymer, a cross-linked polyethylene (XLPE), an ethylene-propylene rubber (EPR) or other solid dielectrics, wherein each may include water tree retardants, fillers, anti-oxidants, WV stabilizers, etc. The insulation layer 24 is coaxially disposed within the jacket 22 and extends the length of the jacket 22. Disposed around the perimeter of the insulation layer 24 is an insulation shield 32. The insulation shield 32 is suitably formed from a compound that includes polyethylene or a similar material and extends the length of the jacket 22. Preferably, the insulation shield 32 is disposed between the outside perimeter of the insulation layer 24 and the plurality of conductive neutral wires 30.

The conductive core 26 is coaxially received within the jacket 24 and is centrally located therein. The conductive core 26 is surrounded by a semiconductive or insulating strand shield 34. The strand shield 34 is suitably formed from a compound that includes polyethylene or a similar material and surrounds the conductive core 26, such that it is disposed between the conductive core 26 and the insulation layer 24.

The conductive core 26 includes a plurality of electrically conductive strands 36. Although a plurality of conductive strands 36 is preferred, a cable having a single conductive strand is also within the scope of the present invention. Suitably, the strands 36 are formed from a copper, aluminum, or other conductive material. The cable 20 includes a total of 18 strands wound together to form the conductive core 26, as is well known in the art.

Still referring to FIGS. 1 and 2, the tube 28 will now be described in greater detail. The tube 28 is formed from a chemically permeable material, such as plastics, sintered metals or fiber resin composites in plastic. Suitable plastics include TEFLON®, and NYLON®. Suitable fiber resin composites include KEVLAR®. The tube 28 has sufficient physical strength to be incorporated in the standing operation and sufficient thermal properties for use in maximum and minimum thermal environments in which the cable 20 may be used. Preferably, the tube 28 has the thinnest wall possible to allow compound storage and free flow, is permeable, and can withstand operating and emergency overload design temperatures of 130° C. or greater. As a non-limiting example, the wall thickness of the tube 28 is suitably between 1/64 and 1/32 of an inch. Although a cylindrical or nearly cylindrical geometry is the preferred geometry for the tube 28, it should be apparent that other hollow geometries are also included within the scope of the present invention.

As received within the conductive core 26, the tube 28 provides a centrally located, unobstructed and longitudinally extending conduit through the length of the cable 20. The tube 28 is adapted to permit a liquid or gas compound to flow therethrough. Preferably, the tube 28 carries an insulation restoration fluid, such as CABLECURE®/XL, a mixture of phenylmethyldimethoxysilane fluid together with other components or ethoxy or propoxy equivalents. Such insulation restoration fluids are injected into the tube 28 and diffuse through the permeable material of the tube 28 and into the insulation to increase the dielectric properties of the insulation, as described in greater detail below.

As noted above, the tube 28 may also carry a gas or desiccant liquid through the length of the cable 20 to keep the cable 20 dry by removing water or other permeable contaminants. As non-limiting examples, such gas or liquids include dry nitrogen, dry air, dry $SF_6$, anhydrous alcohols, or other anhydrous organic liquids that are mutually soluble with water. Further, the tube 28 may be injected with a tracer fluid to aid in the identification of a fault or hole in the cable 20. As a non-limiting example, such tracer fluids include, in pure forms or mixtures, helium, $SF_6$, methane, ethane, propane, butane or any other gas that is detectable with a hydrogen ion detector or a carrier gas, such as nitrogen and a mercaptin. Thus, the tube 28 creates a continuous flow path of permeable membrane to deliver a fluid or gas into the cable 20 along its entire length. The tube 28 can deliver either a fluid or a gas to enhance and prolong the dielectric strength of the insulation layer, or to enhance other cable properties, such as corrosion inhibition, plasticizers replacement, and anti-oxidation replacement.

In operation, the restoration compound is injected and permitted to flow-through the conduit defined by the tube 28. As the restoration compound flows through the length of the tube 28, the restoration fluid diffuses through the permeable material of the tube 28 and disperses into interstitial space 38 extending between the strands 36 of the conductive core 26. It should be apparent that the interstitial space 38 may be filled with a strand fill material, such as polyisobutylene. Preferably, the interstitial space 38 is filled with a strand fill material. The restoration fluid diffuses into the insulation layer 24 through the conductor shield 34. The restoration fluid chemically combines and polymerizes with any water molecules within the cable 20, thereby increasing the dielectric strength of the insulation.

Figure 3:
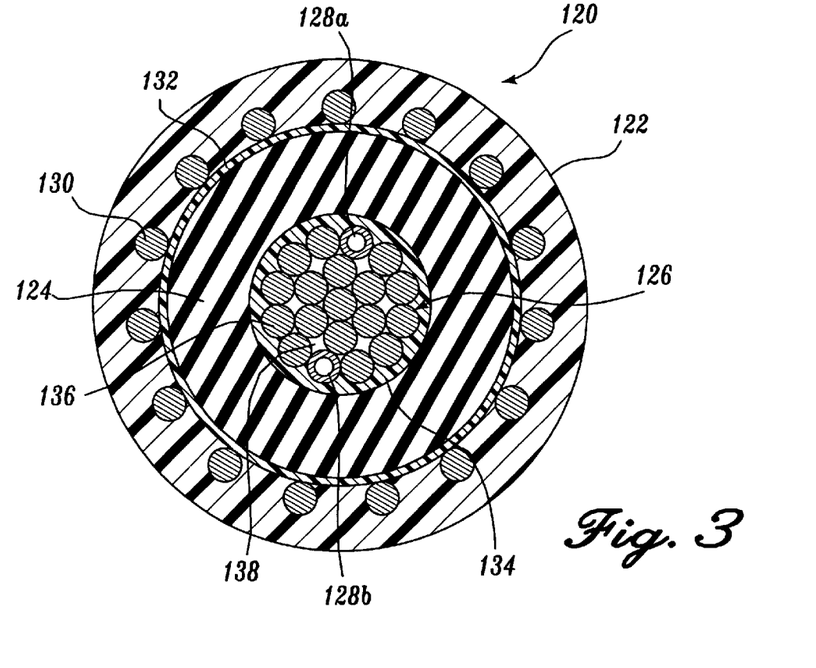
FIG. 3 is a cross-sectional end view of a first alternate embodiment of a flow-through cable for transmitting information formed in accordance with the present invention.

Referring now to FIG. 3, a first alternate embodiment of a cable 120 formed in accordance with the present invention is illustrated. The cable 120 formed in accordance with the present invention is identical in materials and operation as the preferred embodiment described above, with the following exception. Instead of having a centrally located permeable tube 28, the first alternate embodiment includes first and second chemically permeable tubes 128a and 128b disposed within the conductive core 126. As seen in FIG. 3, two outer strands 136 of the conductive core 126 have been replaced by the first and second tubes 128a and 128b. Suitably, the number of strands 136 replaced by the tubes 128 may be increased depending upon the diameter of the tube 128 and the amount of restoration fluid required to treat the insulation 124 of the electric cable 120, as well as the frequency of treatment and retreatment.

Figure 4:
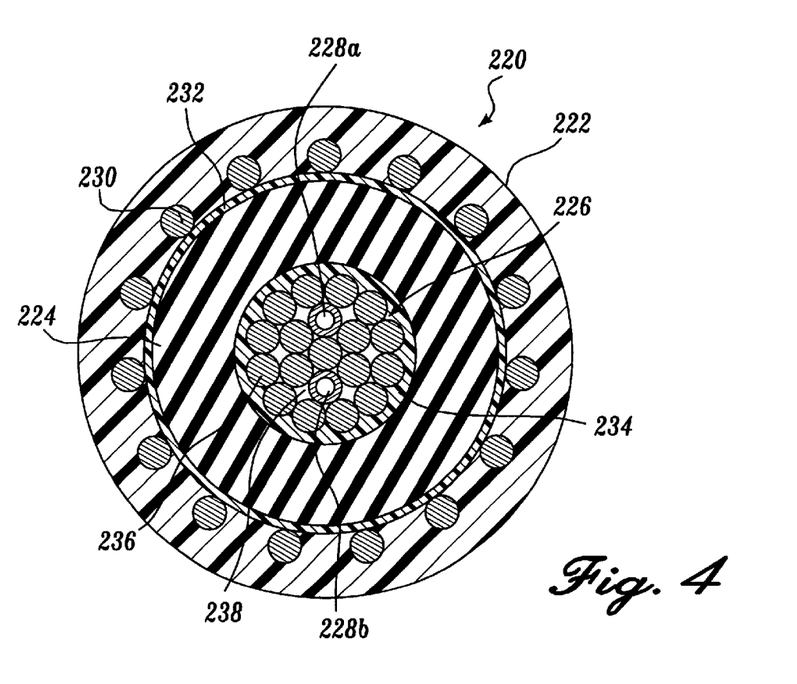
FIG. 4 is a cross-sectional end view of a second alternate embodiment of a flow-through cable for transmitting information formed in accordance with the present invention.

Referring now to FIG. 4, a second alternate embodiment of a cable 220 formed in accordance with the present invention will now be described in greater detail. The cable 220 is identical in materials and operation as the preferred embodiment described above, with the following exception. As seen in FIG. 4, two interior strands 236 of the conductive core 226 have been replaced by first and second permeable tubes 228a and 228b.

Figure 5:
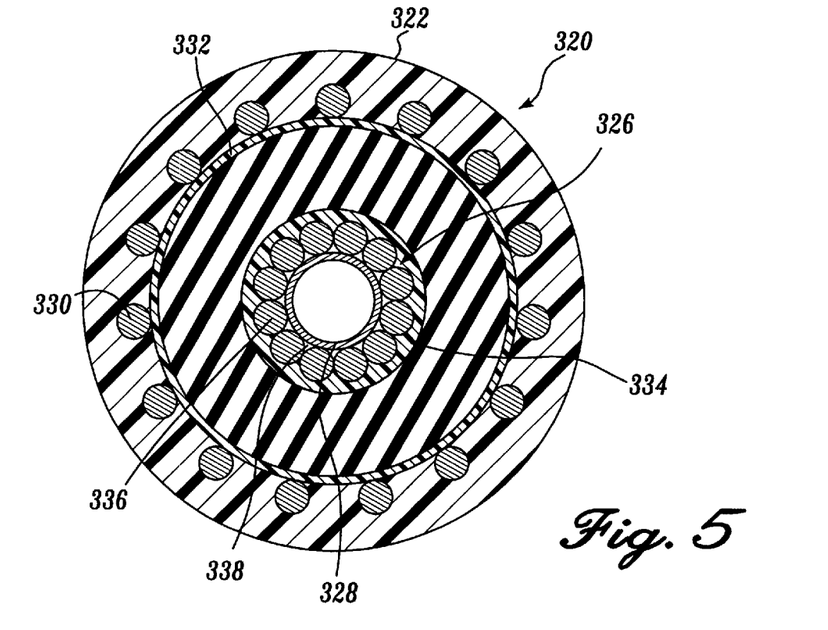
FIG. 5 is a cross-sectional end view of a third alternate embodiment of a flow-through cable for transmitting information formed in accordance with the present invention.

Referring now to FIG. 5, a third alternate embodiment of a cable 320 formed in accordance with the present invention will now be described in greater detail. The cable 320 is identical in materials and operation as the preferred embodiments described above for the cable 20, with the following exception. In this third alternate embodiment, two layers of strands 336 have been replaced with a single permeable tube 328. The tube 328 is centrally located within the conductive core 326 and operates in the identical manner described above for the preferred embodiment.

Figure 6:
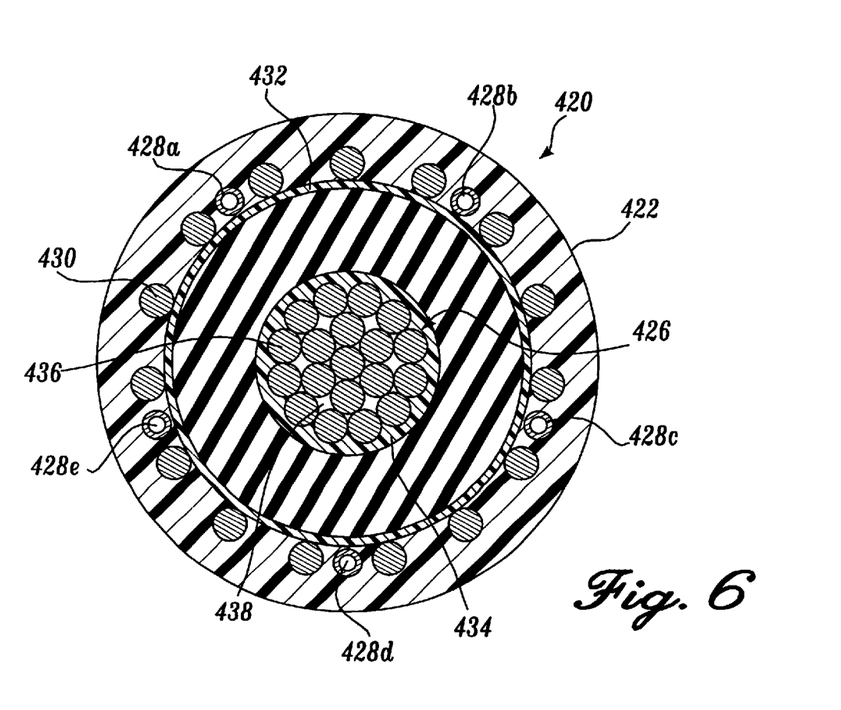
FIG. 6 is a cross-sectional end view of a fourth alternate embodiment of a flow-through cable for transmitting information formed in accordance with the present invention.

Referring now to FIG. 6, a fourth alternate embodiment of a cable 420 formed in accordance with the present invention will now be described in greater detail. The cable 420 is identical in materials and operation to the preferred cable 20 described above, with the following exception. In the fourth alternate embodiment, the cable 420 includes a plurality of permeable tubes 428a–428e disposed within the encapsulating jacket 422. Each tube 428a–428e extends longitudinally within the cable 420 and is suitably disposed between adjacent conductive neutral wires 430. If the jacket 422 is not encapsulating, the tubes 428a–428e may be suitably disposed within the annulus between the jacket 422 and the insulation shield 432. It should be apparent that more or less tubes 428 are also within the scope of the present invention.

Figure 7:
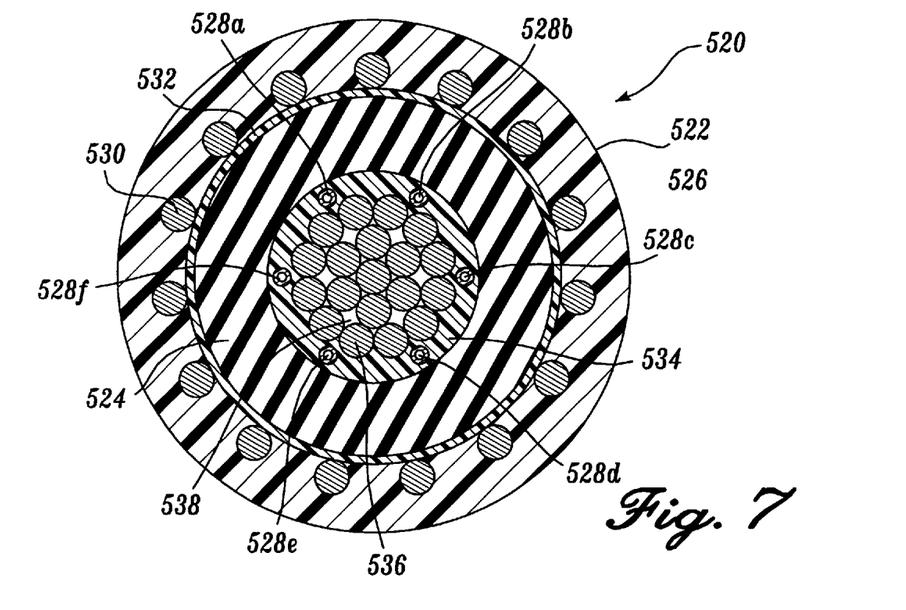
FIG. 7 is a cross-sectional end view of a fifth alternate embodiment of a flow-through cable for transmitting information formed in accordance with the present invention.

Referring now to FIG. 7, a fifth alternate embodiment of a cable 520 formed in accordance with the present invention will now be described in greater detail. The cable 520 is identical in materials and operation as the preferred cable 20 described above, with the following exception. The cable 520 includes a plurality of permeable tubes 528a–528f disposed within the semi-conductive or insulating strand shield 534 and extending longitudinally within the cable 520. The tubes 528a–528f are embedded within the strand shield 534 and operate in the identical manner described above for the preferred embodiment.

Figure 8:
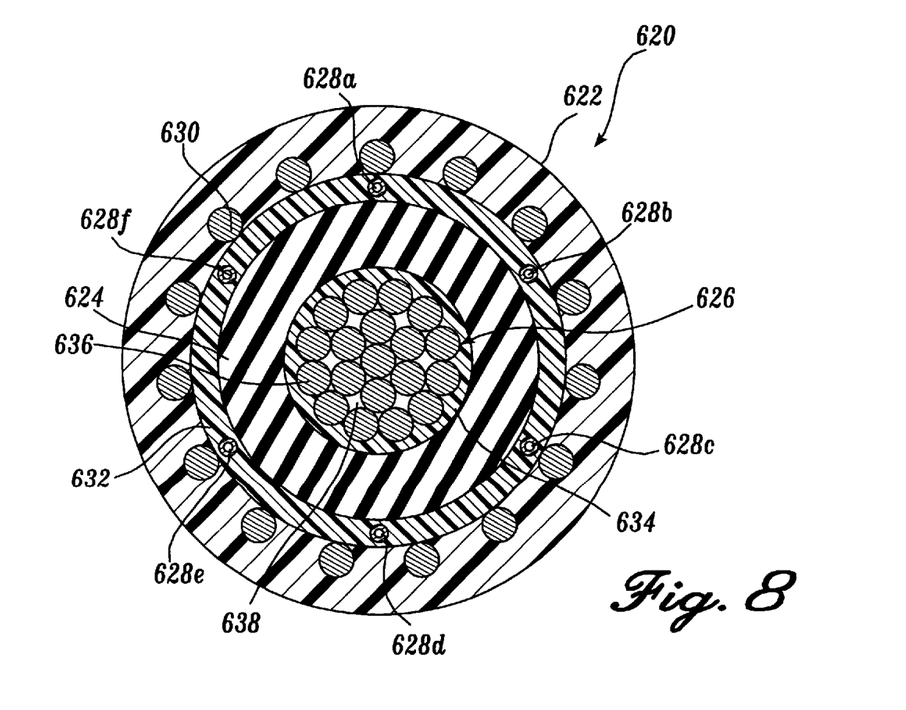
FIG. 8 is a cross-sectional end view of a sixth alternate embodiment of a flow-through cable for transmitting information formed in accordance with the present invention.
Figure 9:
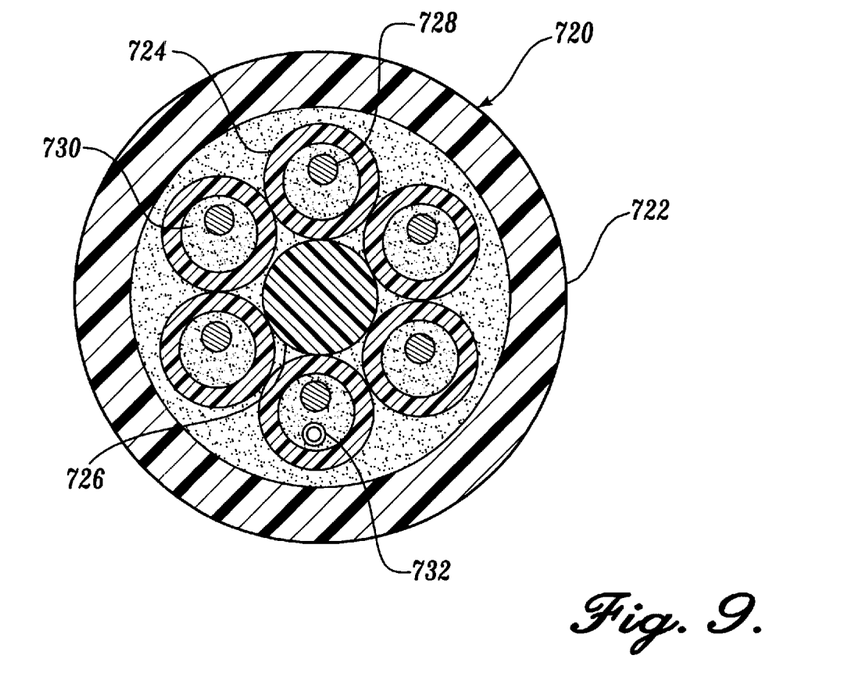
FIG. 9 is a cross-sectional end view of a seventh alternate embodiment of a flow-through cable for transmitting information formed in accordance with the present invention.

Referring now to FIG. 8, a sixth alternate embodiment of a cable 620 formed in accordance with the present invention will now be described in greater detail. The cable 620 is identical in materials and operation as described above for the preferred cable 20, with the following exception. The cable 620 includes a plurality of chemically permeable tubes 628a–628f disposed within the insulation shield 632. Each tube 628a–628f extends longitudinally within the cable 20 and is embedded within the insulation shield 632. It should be apparent that the diameter and number of tubes 628a–628f may vary according to the geometry of the cable 20, the treatment frequency and the desired circumferential uniformity of the treatment.

Referring now to FIG. 9, a seventh alternate embodiment of a cable 720 formed in accordance with the present invention will now be described in greater detail. The cable 720 is illustrated as a well-known fiber optic cable. The cable 720 includes a jacket 722, a plurality of buffer tubes 724 and a central strength member or filler 726. Each buffer tube 724 includes at least one fiber optic cable 728. The fiber optic cable 728 is received within the buffer tube 724 and is potted therein by a well-known filler material 730, such as silicone gel. The cable 720 also includes a permeable tube 732 disposed within the gel 730 of at least one buffer tube 724. The permeable tube 732 is identical in materials and operation to the preferred cable 20 described above. Although encapsulating a single permeable tube 732 within one of the buffer tubes 724 is preferred, it should be apparent that a permeable tube may be disposed within more than one buffer tube 724.

Figure 10:
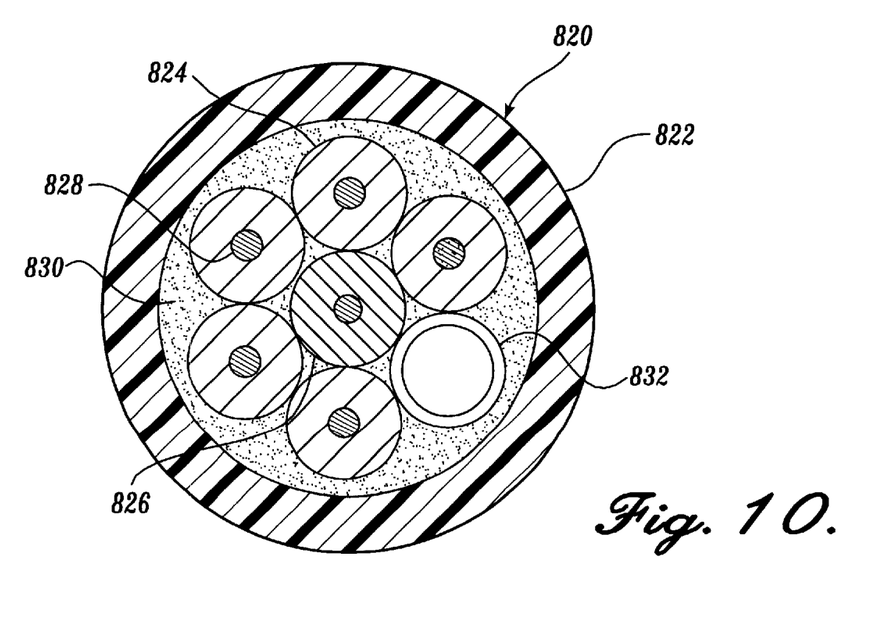
FIG. 10 is a cross-sectional end view of an eighth alternate embodiment of a flow-through cable for transmitting information formed in accordance with the present invention.

Referring now to FIG. 10, an eighth alternate embodiment of a cable 820 formed in accordance with the present invention will now be described in greater detail. In the eighth alternate embodiment, the cable 820 includes a jacket 822, a plurality of buffer tubes 824 and a central strength member or filler 826. Each buffer tube 824 includes a fiber 828. As seen in FIG. 10, the plurality of buffer tubes 824 surround the filler 826 and each tube 824 is surrounded by a well-known flexible strength member 830. Such strength members 830 include flexible aramid yarns, epoxy fiberglass, stainless steel wires, stainless steel mesh, foil tape and plastic rods. The cable 820 is identical in materials and operation to the fiber optic cable 720 described above, with the following exception. In the eighth alternate embodiment, one of the plurality of buffer tubes 824 is replaced with the permeable tube 832. It should be apparent that more than one of the buffer tubes 824 may be replaced with a permeable tube, as seen in FIG. 11.

Figure 11:
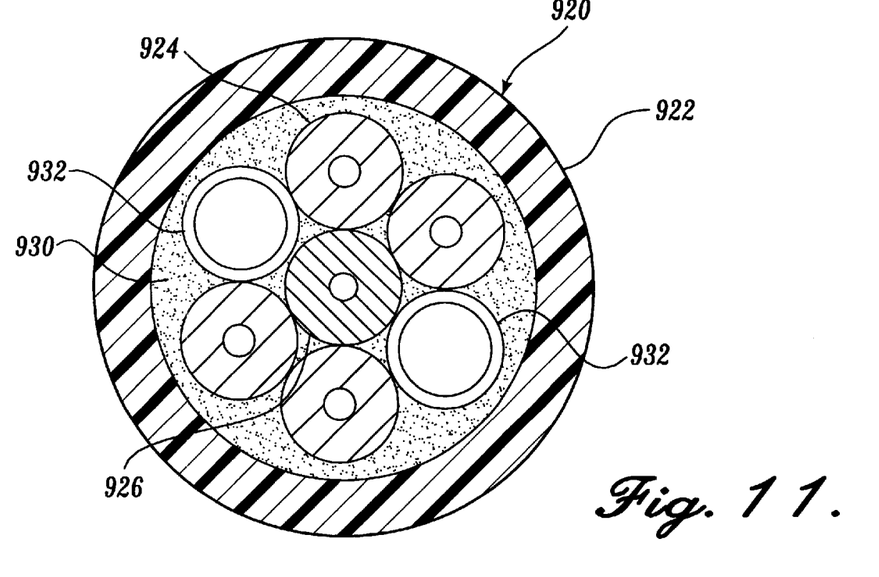
FIG. 11 is a cross-sectional end view of a ninth alternate embodiment of a flow-through cable for transmitting information formed in accordance with the present invention.

The cable 920 illustrated in FIG. 11 is identical in material and operation as the cable illustrated in FIG. 10 with the exception that one of the plurality of buffer tubes 924 has been replaced with a second permeable tube 932. It should be apparent that additional buffer tubes may be replaced with another permeable tube, and therefore, such embodiments are also within the scope of the present invention.

Figure 12:
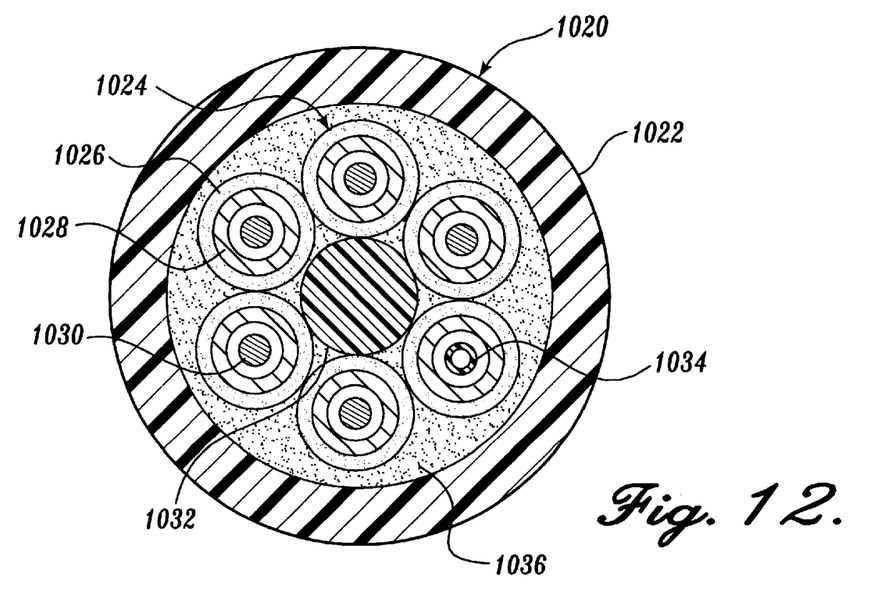
FIG. 12 is a cross-sectional end view of a tenth alternate embodiment of a flow-through cable for transmitting information formed in accordance with the present invention.

Referring now to FIG. 12 a tenth alternate embodiment of a fiber optic cable 1020 formed in accordance with the present invention will now be described in greater detail. The cable 1020 is identical in materials and operation to the fiber optic cable 720 described above with the following exception. In the tenth alternate embodiment, the cable 1020 includes a plurality of buffer tubes 1024 radially disposed around the perimeter of a central strength member or filler 1032. Each buffer tube 1024 includes an inner jacket 1026, a strength member 1028 and a centrally located fiber 1030. In this embodiment, at least one of the centrally located fibers is replaced with a permeable tube 1034. As described above, the permeable tube 1034 is identical in materials and operation to the preferred cable 20 described above. Although it is preferred that a single fiber is replaced with a permeable tube, other configurations, such as replacing two or three fibers with a permeable tube, are also within the scope of the present invention.

Figure 13:
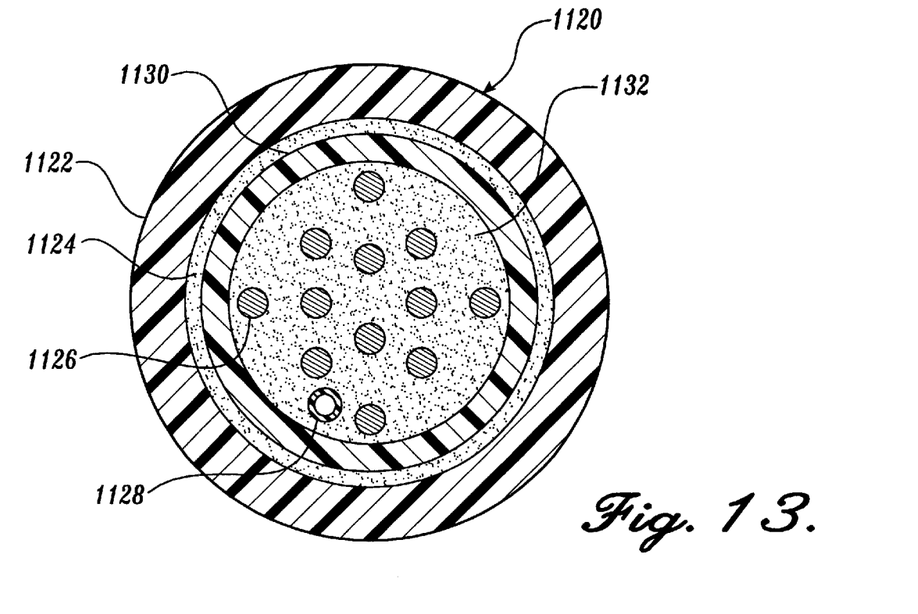
FIG. 13 is a cross-sectional end view of a eleventh alternate embodiment of a flow-through cable for transmitting information formed in accordance with the present invention.

Referring now to FIG. 13 an eleventh alternate embodiment of a cable 1120 formed in accordance with the present invention will be described in greater detail. The cable 1120 is identical in materials and operation to the fiber optic cable 720 described above, with the following exceptions. The cable 1120 includes a single buffer tube 1130 centrally received within a jacket 1122. A strength member 1124 encapsulates the outside perimeter of the buffer tube 1130. The buffer tube 1130 includes a plurality of fibers 1126 and a well-known filler material 1132. The fibers 1126 are received within the buffer tube 1130 and are surrounded by the filler 1132. The buffer tube 1130 also includes a permeable tube 1128. The permeable tube 1128 is identical in materials and operation to the permeable tube described above for the preferred embodiment and is received within the filler 1132 and extends the length of the cable 1120. It should be apparent that more than one permeable tube 1128 may be disposed within the cable.

Figure 14:
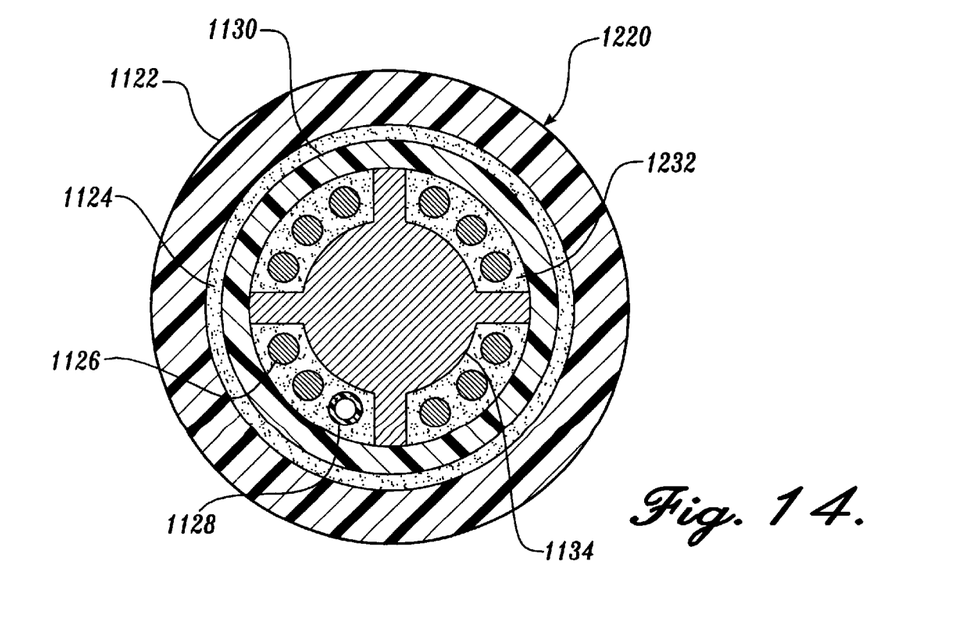
FIG. 14 is a cross-sectional end view of a twelfth alternate embodiment of a flow-through cable for transmitting information formed in accordance with the present invention.

Referring now to FIG. 14 a twelfth alternate embodiment of a cable 1220 formed in accordance with the present invention will now be described in greater detail. The cable 1220 is identical in materials and operation to the fiber optic described in the alternate embodiment of FIG. 13, with the following exception. In this embodiment, the cable 1220 includes a core 1234 with helical slots. The core 1234 may be extruded from a well-known material, such as steel, plastic or fiberglass. The cable 1220 also includes a permeable tube 1228 disposed within the cable. Although a cable 1220 having a single tube 1228 is preferred, other configurations, such as two or more permeable tubes, are also within the scope of the invention.

Figure 15:
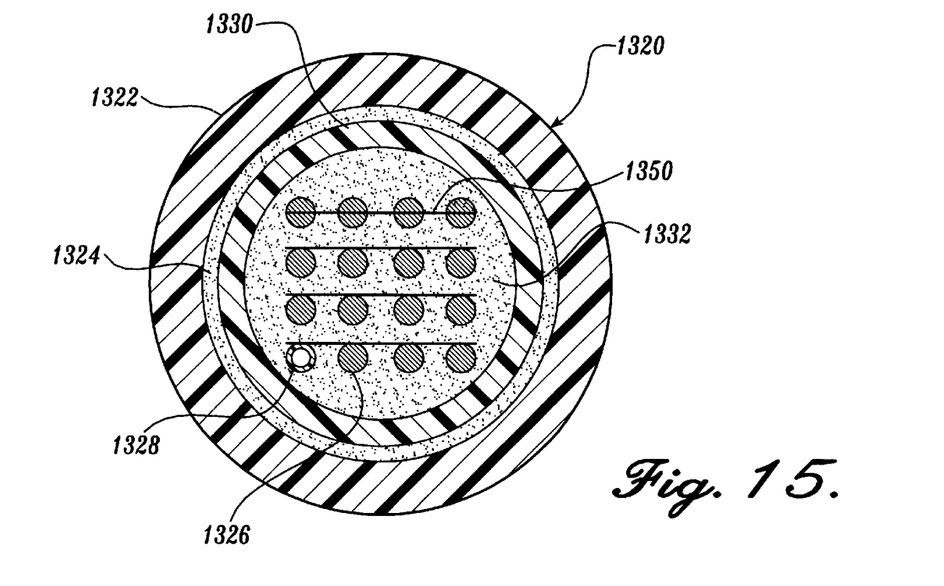
FIG. 15 is a cross-sectional end view of a thirteenth alternate embodiment of a flow-through cable for transmitting information formed in accordance with the present invention.

Referring now to FIG. 15, a thirteenth alternate embodiment of a cable 1320 formed in accordance with the present invention will now be described in greater detail. The cable 1320 is identical in materials and operation to the cable 1220 described above, with the following exception. The cable 1320 includes a plurality of fiber optic cables 1326 strung together in a well known manner, such as by an extruded plastic connector 1350. In this alternate embodiment, a permeable tube 1328 may be attached to one of the plurality of fiber optic cables strung together by the plastic connector. It should be apparent that two or more permeable tubes may be disposed within the cable 1320 and, therefore, is also within the scope of the present invention.

Figure 16:
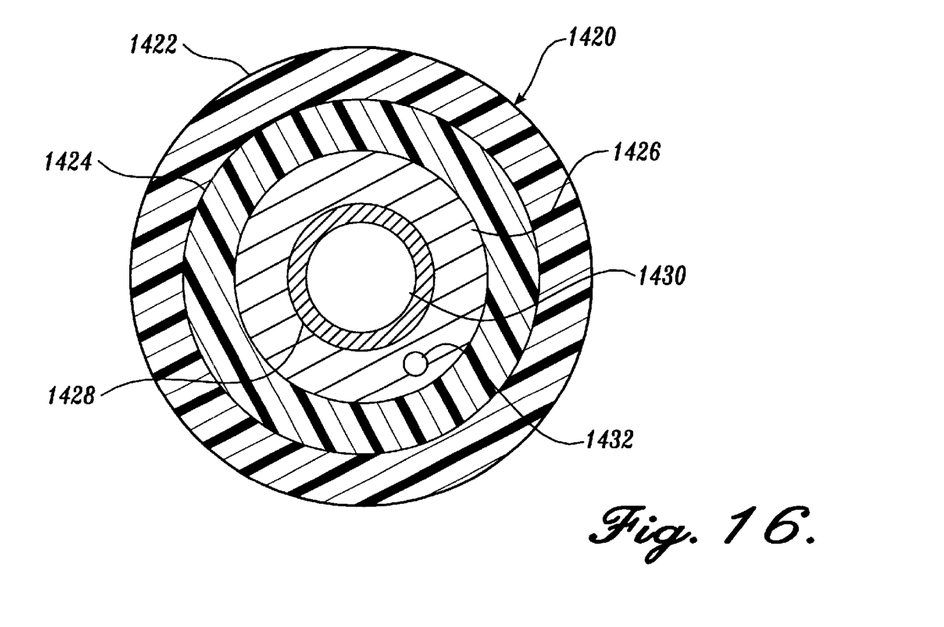
FIG. 16 is a cross-sectional end view of a fourteenth alternate embodiment of a flow-through cable for transmitting information formed in accordance with the present invention.

Referring now to FIG. 16 a fourteenth alternate embodiment of a cable 1420 formed in accordance with the present invention will now be described in greater detail. The cable 1420 is identical in materials and operation to the cable 720 described above, with the following exception. The cable 1420 includes an outer jacket 1422, an inner jacket 1424 and a flexible strength member 1426. The inner jacket 1424 and flexible strength member 1426 are concentrically received within the outer jacket 1422. Centrally received within the flexible strength member 1426, is a buffer jacket 1428 and a fiber 1430. A permeable tube 1432 is disposed within the flexible strength member 1426 and extends the length of the cable 1420. The permeable tube 1432 is identical in materials and operation to the permeable tube described above for the preferred embodiment.

Figure 17:
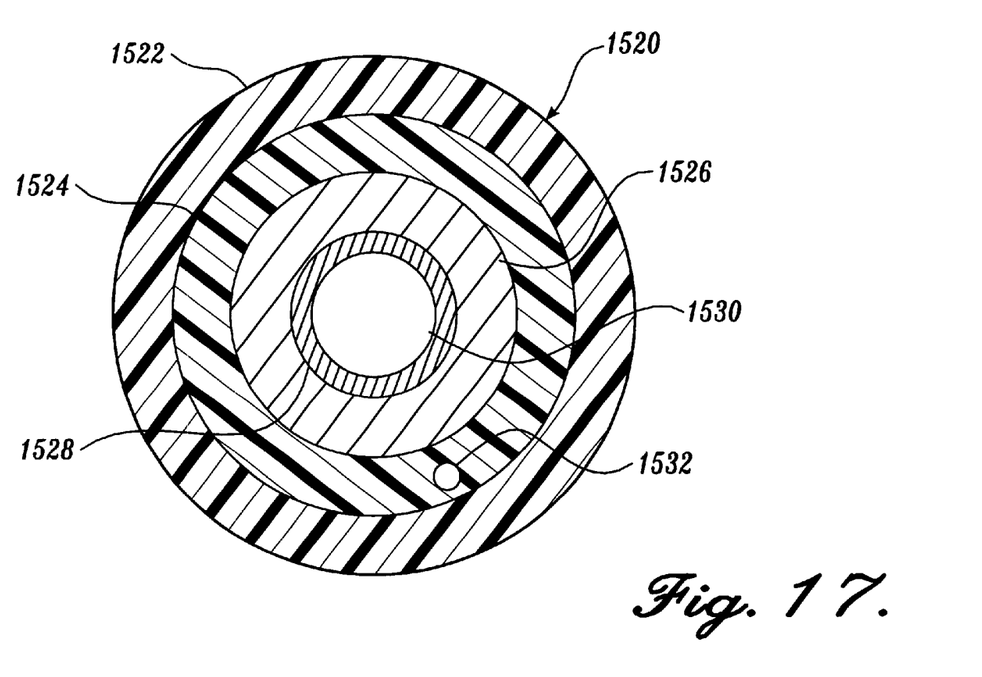
FIG. 17 is a cross-sectional end view of a fifteenth alternate embodiment of a flow-through cable for transmitting information formed in accordance with the present invention.

Referring now to FIG. 17, a fifteenth alternate embodiment of a cable 1520 formed in accordance with the present invention will now be described in greater detail. The cable 1520 is identical in materials and operation to the tube 1420 described above with the following exception. The permeable tube 1532 is disposed within, and is surrounded by the inner jacket 1524. The permeable tube 1532 is identical in material and operation to the preferred cable 20 described above. It should be apparent that more than one permeable tube may be disposed within one or more layers of the cable shown in either FIG. 16 or 17.

The previously described versions of the present invention provide several advantages over cables currently available in the art. First, disposing a permeable tube within the cable eliminates the expense of a large conduit sheathing the outside diameter of the cable, thereby decreasing the installed cost of the cable. Second, disposing tubes within the cable provides a mechanism to extend the life of the cable for less than a cable disposed within a large conduit on both an initial cost and life-cycle cost basis. Further, because the tube is disposed within the existing diameter of a flow-through cable for transmitting information, it has a smaller overall diameter when compared to a cable inserted within a larger diameter conduit and, therefore, permits less expensive installation. Also, providing a dedicated conduit to distribute restoration compounds throughout the length of a flow-through cable for transmitting information ensures an unblocked path by which the compound may flow, thereby enhancing dielectric performance and longevity of the cable. Finally, as the permeable tube is adapted to receive a variety of compounds, a cable formed in accordance with the present invention is more robust than those currently available. Thus, a flow-through cable for transmitting information formed in accordance with the present invention is cheaper to manufacture and operate, is more reliable, and is more versatile than electric cables currently available in the art.

From the foregoing descriptions, it may be seen that a flow-through cable for transmitting information formed in accordance with the present invention incorporates many novel features and offers significant advantages over currently available electric cables. While the presently preferred embodiments of the invention have been illustrated and described, it is to be understood that within the scope of the appended claims, various changes can be made therein without departing from the spirit and scope of the invention. As a non-limiting example, the size and diameter of the permeable tube may be varied according to the size of the electric cable and the amount of restoration fluid that will be needed to treat the insulation of the particular cable. As a second non-limiting example, a cable formed in accordance with the present invention may not include a jacket 22. Such cables are known as bare concentric neutral cables. As a third non-limiting example, the conduit may be stranded with other conductive strands or may be formed in the stranding operation by extrusion or by leaving a strand or strands absent of conductor and strand filled materials. Alternatively, if the conduit is in a polymer membrane, such as within the shields or within the jacket, the conduit can be extruded in place. In summary, the tubes may be sized differently for each size of cable or the frequency of treatment can be varied to optimize performance. As a result, it should be appreciated that various changes can be made to the embodiments of the invention without departing from the spirit and scope of the invention.

What is claimed is:

1. A flow-through cable for transmitting information, comprising:
   (a) a housing having a length;
   (b) an information conducting core disposed within the housing;
   (c) a first conduit disposed within the housing, the first conduit adapted to permit a compound to flow therethrough, the first conduit being chemically permeable to permit at least a portion of the compound to diffuse through the first conduit.

2. The flow-through cable for transmitting information of claim 1, further comprising a first insulation layer surrounding the information conducting core, wherein the information conducting core is a plurality of power strands.

3. The flow-through cable for transmitting information of claim 2, wherein the first conduit is centrally received within the plurality of power strands.

4. The flow-through cable for transmitting information of claim 2, further comprising a plurality of chemically permeable conduits, the plurality of conduits being disposed within the plurality of power strands.

5. The flow-through cable for transmitting information of claim 2, further comprising a strand shield surrounding the plurality of power strands, the first conduit being disposed within the strand shield.

6. The flow-through cable for transmitting information of claim 2, further comprising an insulation shield surrounding the first insulation layer, wherein the first conduit is embedded within the insulation shield and extending the length of the housing.

7. The flow-through cable for transmitting information of claim 1, further comprising a flexible strength member, wherein the information conducting core is a fiber optic cable.

8. The flow-through cable for transmitting information of claim 7, wherein the first conduit is disposed within the flexible strength member.

9. The flow-through cable for transmitting information of claim 7, further comprising at least a first buffer tube disposed within the flexible strength member and the fiber optic cable is received within the first buffer tube, wherein the first conduit is disposed within the first buffer tube.

10. The flow-through cable for transmitting information of claim 9, further comprising an inner jacket received within the first buffer tube, and wherein at least one of the plurality of buffer tubes includes a centrally received permeable tube.

11. The flow-through cable for transmitting information of claim 7, further comprising a buffer tube received within the first insulation layer, the flow-through cable for transmitting information further comprising a plurality of fiber optic cables and at least a first permeable tube, wherein the plurality of fiber optic cables and the at least first permeable tube being disposed within the buffer tube.

12. The flow-through cable for transmitting information of claim 7, further comprising a buffer jacket surrounding the fiber optic cable, wherein the first conduit is disposed within the buffer jacket.

13. The flow-through cable for transmitting information of claim 7, further comprising a buffer jacket surrounding the fiber optic cable and an inner jacket surrounding the buffer jacket, wherein the first conduit is disposed within the inner jacket.

14. A flow-through cable for transmitting information, comprising:
   (a) a housing having a length;
   (b) a plurality of information conducting cores received within the housing;
   (c) a first insulation layer surrounding the plurality of information conducting cores; and
   (d) a first conduit disposed within the housing, the first conduit adapted to permit a compound to flow therethrough, the first conduit being chemically permeable to permit at least a portion of the compound to diffuse through the first conduit.

15. The flow-through cable for transmitting information of claim 14, wherein the plurality of information conducting cores are a plurality of power strands.

16. The flow-through cable for transmitting information of claim 15, wherein the first conduit is centrally received within the plurality of power strands.

17. The flow-through cable for transmitting information of claim 15, further comprising a chemically permeable second conduit, the first and second conduits being disposed within the plurality of power strands and extending the length of the housing.

18. The flow-through cable for transmitting information of claim 15, further comprising a shield surrounding the plurality of power strands, the first conduit being disposed within the shield.

19. The flow-through cable for transmitting information of claim 15, further comprising an insulation shield surrounding the first insulation layer, the first conduit is embedded within the insulation shield and extending the length of the housing.

20. A flow-through cable for transmitting information, comprising:
   (a) a housing having a length;
   (b) a plurality of power strands received within the housing;
   (c) a first insulation layer surrounding the plurality of power strands, the insulation layer having dielectric properties; and
   (d) a first conduit disposed within the tubular housing and extending at least the length of the tubular housing, the first conduit adapted to permit a compound to flow therethrough, the first conduit being chemically permeable to permit at least a portion of the compound to diffuse through the first conduit to improve the dielectric properties of the first insulation layer.

21. The flow-through cable for transmitting information of claim 20, further comprising a chemically permeable second conduit, the first and second conduits being disposed within the plurality of power strands and extending at least the length of the tubular housing.

22. The flow-through cable for transmitting information of claim 20, wherein the first conduit is centrally received within the plurality of power strands.

23. The flow-through cable for transmitting information of claim 20, further comprising a shield surrounding the plurality of power strands, the first conduit being disposed within the shield.

24. The flow-through cable for transmitting information of claim 20, further comprising an insulation shield surrounding the first insulation layer, wherein the first conduit is disposed within the insulation shield.

25. The flow-through cable for transmitting information of claim 24, further comprising a chemically permeable second conduit, the first and second conduits being disposed within the insulation shield and extending at least the length of the tubular housing.

26. A flow-through cable for transmitting information, comprising:

(a) an information conducting core;

(b) a first insulation layer surrounding the information conducting core; and (c) a first conduit disposed within either the information conducting core or the first insulation layer, the first conduit adapted to permit a compound to flow therethrough, the first conduit being chemically permeable to permit at least a portion of the compound to diffuse through the first conduit.

* * * * *